United States Patent [19]

Koide et al.

[11] 4,153,766

[45] May 8, 1979

[54] CONTINUOUS PROCESS FOR THE PRODUCTION OF ETHYLENE TEREPHTHALATE POLYESTERS

[75] Inventors: Tohru Koide, Yao; Tabashi Ezawa, Kashihara; Hideki Onoda; Chiharu Masaki, both of Settsu; Tohru Morita, Osaka, all of Japan

[73] Assignee: Kanebo Ltd., Tokyo, Japan

[21] Appl. No.: 735,199

[22] Filed: Oct. 26, 1976

Related U.S. Application Data

[63] Continuation of Ser. No. 444,778, Feb. 22, 1974, abandoned.

[51] Int. Cl.² .............................................. C08G 63/22
[52] U.S. Cl. ...................................... 526/59; 528/309
[58] Field of Search ........................ 260/75 M; 137/92

[56] References Cited

U.S. PATENT DOCUMENTS

| | | | |
|---|---|---|---|
| T861,005 | 4/1969 | Cecchini | 260/75 M X |
| 3,438,942 | 4/1969 | Scheller | 260/75 M |
| 3,475,392 | 10/1969 | McCoy et al. | 260/83.7 |
| 3,502,622 | 3/1970 | Reichel et al. | 260/75 M |
| 3,503,937 | 3/1970 | Allen et al. | 260/75 M X |
| 3,878,379 | 4/1975 | Moody et al. | 260/75 M X |

*Primary Examiner*—Walter C. Danison
*Attorney, Agent, or Firm*—Armstrong, Nikaido, Marmelstein & Kubovcik

[57] ABSTRACT

In a continuous process for the production of ethylene terephthalate polyesters, when the control value for the viscosity which relates to the degree of the polymerization in a polymerization vessel exceeds a predetermined value, a desired command value of the viscosity at the output of the preceding polymerization vessel is automatically revised.

4 Claims, 4 Drawing Figures

CONTINUOUS PROCESS FOR THE PRODUCTION OF ETHYLENE TEREPHTHALATE POLYESTERS

This is a continuation, of application Ser. No. 444,778 filed Feb. 22, 1974, now abandoned.

BACKGROUND OF THE INVENTION

The present invention relates to a continuous process for producing ethylene terephthalate polyesters.

By the term "ethylene terephthalate polyesters" referred to herein we mean those polyesters predominantly comprised of combined ethylene terephthalate units. The term "a polyester-forming fusion melt predominantly comprised of bis-2-hydroxyethyl terephthalate or its low polymers" used herein means a fusion melt suitable for use in the production of an ethylene terephthalate polyester. Other units or components which may be present in the fusion melt to produce copolyesters are well known in the art, and include, for example, bis-2-hydroxyethyl isophthalate, 2-hydroxylethyl p-2-hydroxyethoxybenzoate, and the like. While the description given herein is mainly directed to the production of poly(ethylene terephthalate) it will be appreciated that the invention also contemplates the procuction of other polyesters predominantly comprised of combined ethylene terephthalate units.

There are two routes to poly(ethylene terephthalate); one route comprising the transesterification of dimethyl terephthalate with ethylene glycol (hereinafter referred to as EG), followed by the polymerization of the resultant bis-2-hydroxylethyl terephthalate or its low polymers (hereinafter referred to as BHET), while another route comprising the direct esterification of terephthalic acid (hereinafter referred to as TPA), followed by the polymerization of the resultant BHET. The polymerization may be carried out either batchwise by heating the BHET in one single reaction vessel under an increasing degree of vacuum (i.e. decreasing residual pressure) until the desired degree of polymerization is achieved, or continuously by-passing the BHET in sequence through a series of reduced pressure polymerization vessels maintained under steppedly decreasing residual pressures to obtain a product having the desired degree of polymerization from the last vessel. Early commercial production of ethylene terephthalate polyesters was carried out by a combination of transesterification and batchwise polymerization. Recently a technology of direct esterification of TPA has been advanced and as a result, ethylene terephthalate polyesters have begun to be commercially produced by processes involving direct esterification of TPA, followed by batchwise or even continuous polymerization.

One of the advantages of the continuous polymerization resides in the fact that it enables the continuous production of polyesters in melt form, which may directly be spun into filaments without the additional steps of being extruded into strands, chilled with water, cut into pellets, dried and then melted again, as required in the batchwise polymerization. Furthermore, an additional residence time is generally required in the batchwise polymerization, during which time the product must be held in melt form before being extruded into strands and during which any undesirable reaction under heat can degrade the quality of the product. With the continuous polymerization such an additional residence time can be eliminated or at least substantially reduced. Accordingly, the continuous polymerization is preferred in this regard, even when it is not directly coupled with the spinning process.

In the batchwise polymerization wherein BHET is heated in one single vessel under an increasing degree of vacuum, the desired degree of polymerization of the product may readily be controlled simply by detecting a melt viscosity of the material which is proportional to the degree of polymerization, by e.g., observing a reverse force exerted on a stirrer, and breaking the vacuum when the desired melt viscosity is reached. Whereas, in the continuous polymerization wherein the degree of polymerization of the product is gradually increased during the passage of the polymerizing material through a series of polymerization vessels and it takes a certain period of time for the material to pass through each vessel, the degree of polymerization can be kept at the desired level only after due consideration of these factors, and cannot be as easily controlled as in the batchwise polymerization. With feed-back cascade control wherein only a melt viscosity of the material leaving each vessel is detected and a set point or command value of a manipulating factor or pressure control thereof, for example, a degree of vacuum in said vessel is reset by a controlling system which operates to control the degree of polymerization in cascade, the degree of polymerization in the continuous polymerization process cannot be controlled precisely if there is any variance of the melt viscosity of the material leaving a vessel just upstream of said vessel. This is because the polymerizing material takes a certain period of time to pass through said vessel and, therefore, there is a corresponding time lag until said variance manifests itself as one of the factors contributing to a variance of the melt viscosity of the material leaving said vessel.

SUMMARY OF THE INVENTION

Accordingly, it is a primary object of the invention to provide a continuous process for the production of ethylene terephthalate polyesters while precisely controlling the degree of polymerization of the product.

In accordance with the invention we provide a continuous process for the production of ethylene terephthalate polyesters which comprises passing a polyester-forming fusion melt predominantly comprised of bis-2-hydroxyethyl terephthalate and/or its low polymers sequentially through a series of reduced pressure polymerization vessels while controlling the degree of polymerization of the product by a controlling system. The invention is characterized in that a melt viscosity of material leaving each of said vessels, except for the first vessel, is controlled in cascade by the steps of: measuring melt viscosities of material entering and leaving said vessel at time intervals; storing the values so measured in a memory in said controlling system; adding a value which corresponds to a deviation of a measured value for the melt viscosity of the material leaving said vessel at a certain time from a command value thereof to a value which corresponds to a deviation of a measured value for the melt viscosity of material entering said vessel at a predetermined time interval prior to said certain time from a command value thereof; setting in response to the resultant sum a set point or command value for a manipulating factor or pressure control of said melt viscosity and; when the value so set falls outside a predetermined range, resetting automatically by said controlling system a command value for a melt viscosity of the material leaving a vessel just upstream of said vessel.

A melt viscosity of the material leaving the first vessel may be controlled by measuring said viscosity, and setting in response to the value so obtained a command value for a manipulating factor in said first vessel. There are many factors for manipulating a melt viscosity of the melt material, such as stirring speed, internal temperature of a vessel, and rate of flow. Among them the degree of vacuum in said vessel is preferably used for controlling the melt viscosity of the material.

BRIEF DESCRIPTION OF THE DRAWINGS

A preferred embodiment of the invention will be described with reference to the attached drawings, in which.

DESCRIPTION OF THE PREFERRED EMBODIMENT

Figure 1:
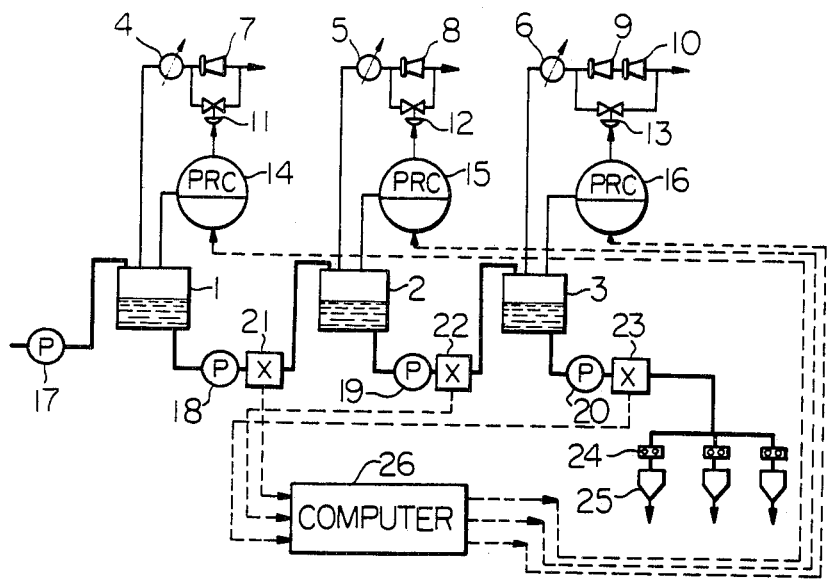
FIG. 1 is a flow-chart which illustrates a continuous process for the production of ethylene terephthalate esters in accordance with the invention.

Referring to the drawings specifically, there is shown in FIG. 1 a continuous polymerization system involving three polymerization vessels 1, 2 and 3. A polyester-forming material predominantly comprised of BHET and/or its low polymers is fed to the first polymerization vessel 1 by means of pump 17 and passed through vessels 1, 2 and 3 in sequence by pumps 18, 19 and 20, respectively. During the passage, vapor of EG evolved from the polymerizing material is withdrawn through condensers, 4, 5 and 6 and, the highly polymerized polyester in melt form which leaves the last polymerization vessel 3 is metered by a spinning pump 24 and the melt spun into filaments through a spinneret 25. The internal temperature of each vessel is controlled to a predetermined level by means of a heating jacket (not shown) surrounding said vessel, and the degree of vacuum in each vessel is controlled to a set point or command value for the degree of vacuum in said vessel, which values are set by means of ejector nozzles 7, 8 and 9, and 10, pressure regulating controllers 14, 15 and 16 and controlling valves 11, 12 and 13. The set values of pressure regulating controllers 14, 15 and 16 are operated by signals from a computer system 26. The melt viscosity of the material leaving each vessel is measured at time intervals by a suitable viscometers 21, 22, and 23 and the measured data is stored in a memory in computer system 26.

The technique for control of the chemical plant according to the present invention will now be described, however, only with regard to the control of the polymerization vessel 3 for the sake of simplicity of the explanation. At first the control value $X_3$ relating to the deviation of melt viscosity at the output of the polymerization vessel 3 is calculated using the following formula (1) relating to the feedback control by a computer system 26.

$$X_3 = K_{b3}(\epsilon_3 + \frac{1}{T_{i3}} \int \epsilon_3 dt + T_{d3} \frac{d\epsilon_3}{dt}) \tag{1}$$

where; $\epsilon_3$ is the difference of melt viscosity at the output of the polymerization vessel 3 between a desired command value and a measured value of viscosity measured by the viscometer 23;

$K_{b3}$ is a proportional constant;

$T_{i3}$ is an integral time, and;

$T_{d3}$ is a differential time.

The computer system 26, also, calculates the time $T_{b3}$ using the following formula (2). The time $T_{b3}$ is the time from the deviation of melt viscosity at the output of the polymerization vessel 2, unit the revision of the control value, which determines the polymerization speed in the polymerization vessel 3.

$$T_{b3} \frac{Q_3}{q_3} - T_{a3} \tag{2}$$

where $Q_3$ is a quantity stored in the polymerization vessel 3;

$q_3$ is quantity of flow in a unit time of BHET or its polymer to the polymerization vessel 3;

$T_{a3}$ is the delay time of the response from the revision of the desired command value until the response to that revision of the measured value by the viscometer at the output of the polymerization vessel 3.

According to a value $T_{b3}$, a value $V_{b2}$, which is the measured melt viscosity at the output of the polymerization vessel 2 before a time lag $T_{b3}$, is read from a memory of the computer system 26 and the operational variation $y_{23}$ is obtained by the following formula.

$$y_{23} = K_f(V_{s2} - V_{b2}) \tag{3}$$

where $V_{s2}$ is a desired command value of melt viscosity at the output of the polymerization vessel 2 before a time lag $T_{b2}$.

A revised desirable value $Z_3$ relating to the pressure is obtained by the following formula (4) using the result of the calculation of the formulae (1) and (3).

$$Z_3 = f(X_3 + y_{23}) \tag{4}$$

The function of the formula (4) is defined beforehand by a table in the memory or a function generator installed in the computer system 26.

A pulse signal which relates to said value $Z_3$ is applied from the computer system 26 to a pressure regulating controller 16 which controls the degree of polymerization in the vessel 3, and the desired command value of said controller 16 is revised. At that time, if said value $Z_3$ is out of the range between $Z_{m3}$ and $Z_{n3}$ but is in the range between $Z_{h3}$ and $Z_{l3}$ in FIG. 2, then, not only said value of the polymerization vessel 3, but also the command value of the preceding polymerization vessel 2, is revised according to the following formula (5), where FIG. 2 shows one curve of the relationship between time (horizontal axis) and a value $Z_3$ (upper half of vertical axis), and the relationship between time and the command value $V_{s2}$ of viscosity (lower half of vertical axis).

$$V_{s2} = \begin{cases} V_{s2b} + K_{s2}(Z_3 - Z_{m3}), \text{ where } Z_{m3} < Z_3 \leq Z_{n3} \\ V_{s2b} + K_{s2}(Z_3 - Z_{n3}), \text{ where } Z_{l3} < Z_3 \leq Z_{n3} \end{cases} \quad (5)$$

Figure 2:
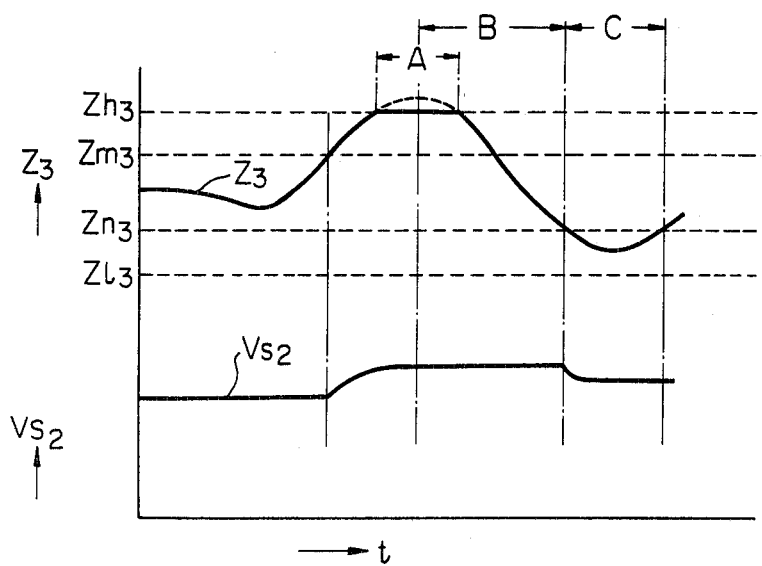
FIG. 2 is a graph for illustrating secondary control in accordance with the invention.

Further, when said value $Z_3$ exceeds the upper limit $Z_{h3}$ or the lower limit $Z_{l3}$, the revised value of $Z_3$ is maintained at $Z_{h3}$ or $Z_{l3}$ as shown in section A in FIG. 2, and the desired command value of the preceding vessel 2 is revised at the same time. Once the command value of viscosity of the preceding vessel 2 is revised, due to $Z_3$ being larger than $Z_{m3}$ or $Z_3$ smaller than $Z_{n3}$, said command value of the preceding vessel 2 is maintained constant as shown in section B in FIG. 2, where an absolute value $(Z_3-Z_{m3})$ or $(Z_3-Z_{n3})$ in said formula (5) is reduced and the viscosity at the output of the vessel 3 approaches its own desired command value due to the effect of the revision of the command value of the preceding vessel 2. However, in section C of FIG. 2, when the value $Z_3$ exceeds the opposite limit the command value of the preceding polymerization vessel 2 is revised again according to the formula (5).

Although the embodiment above is explained with regard to only the polymerization vessel 3, the same discussion as above is possible for the polymerization vessels 1 and 2. However, in the case of the polymerization vessel 1 which has no preceding polymerization vessel, the deviation to be obtained by the formula (3) is set to zero and the calculation by the formula (5) is not performed. In the case of said vessel 1, when the control value for the polymerization vessel 1 exceeds the limit $Z_{m1}$ or $Z_{n1}$ (which corresponds to $Z_{m3}$ or $Z_{n3}$ for the polymerization vessel 3), a sound or light alarm signal alerts a plant operator. Further, when said control value exceeds the second limit $Z_{h1}$ or $Z_{l1}$ (which correspond to $Z_{h3}$ or $Z_{l3}$ for the polymerization vessel 3), the alarm signal again alerts the plant operator and the control value is maintained at said second limit $Z_{h1}$ or $Z_{l1}$.

According to a control method which is applicable to the polymerization vessels 1, 2 and 3, the viscosity at the outputs of the polymerization vessels 1 and/or 2 is controlled automatically to the desirable value where the control of the viscosity is very easy, and the degree of the polymerization in the vessel 3 becomes stable.

Some experimental results will now be explained.

EXAMPLE 1

A stream of a slurry essentially consisting of 100 mole parts of TPA, 120 mole parts of EG and 0.023 mole part of antimony trioxide as a catalyst was subjected to direct esterification conditions in a separate vessel for continuous esterification to provide a stream of BHET, which was then fed to an apparatus for continuous polymerization, as shown diagrammatically in FIG. 1. Selecting respective degrees of vacuum in these vessels as a manipulating factor which control the degree of polymerization, the continuous polymerization was carried out in accordance with the invention for a period of one week while keeping the inner temperature of each vessel at a temperature of 270° C. with the initial viscosity of the material leaving the first vessel 1 set as 7.5 poises, the initial viscosity of the material leaving the second vessel 2 set as 360 poises and the command value for the melt viscosity of material leaving the third vessel set as 3,500 poises at 280° C. The results obtained are shown in Table I below.

COMPARATIVE EXAMPLE 1

While controlling the polymerization by changing the command value for the degree of vacuum in each polymerization vessel according to the variance of the melt viscosities of the material entering and leaving each vessels, the procedure as described in Example 1 was repeated except that resetting of the command values for the melt viscosities of material leaving the first and second vessels was omitted. The results so obtained are shown in TAble I below.

COMPARATIVE EXAMPLE 2

The procedure as described in Comparative Example 1 was repeated except that the command value for the degree of vacuum in each of the second and third vessels was set according to merely a variance of the melt viscosity of material leaving said vessel (i.e. a variance of the melt viscosity of material entering said vessel was not taken into account). The results are shown in Table I below.

Table I

|  | Melt viscosity in poise at 280° C. | Intrinsic viscosity ($\eta$) | Carboxyl group content* |
|---|---|---|---|
| Example 1 | 3500 ± 100 | 0.655 ± 0.005 | 31.5–35.2 |
| Comparative Example 1 | 3500 ± 250 | 0.655 ± 0.011 | 23.8–45.1 |
| Comparative Example 2 | 3500 ± 450 | 0.655 ± 0.023 | 28.5–43.2 |

*numbers of equivalent in $10^6$ g of polymer

As seen from the results shown in Table I, the process of the invention, as revealed in Example 1, enables the continuous production of poly(ethylene terephthalate) having uniform quality, i.e., with minimum variance in the degree of polymerization and the terminal carboxyl content. Whereas, in the case wherein resetting of the values to be reached for the melt visosities of material leaving the first and second vessels was not carried out, as in Comparative Example 1, an unacceptably broad variance in the degree of polymerization results upon prolonged operation, even though the degree of vacuum in each of the vessels except the first one is controlled in cascade according to the viscosities of material entering and leaving said vessel. The product also has a wide variance in its terminal carboxyl content. If the degree of polymerization is controlled by controlling the degree of vacuum in each vessel in cascade according to merely the viscosity of material leaving said vessel, the variance of the degree of polymerization becomes too broad, beyond the allowable range, and such a product, when directly spun into filaments, made into a fabric and dyed, will not dye evenly.

Concerning the computer system 26, a digital computer system, an analog computer system or a hybrid computer system can be utilized.

Figure 3:
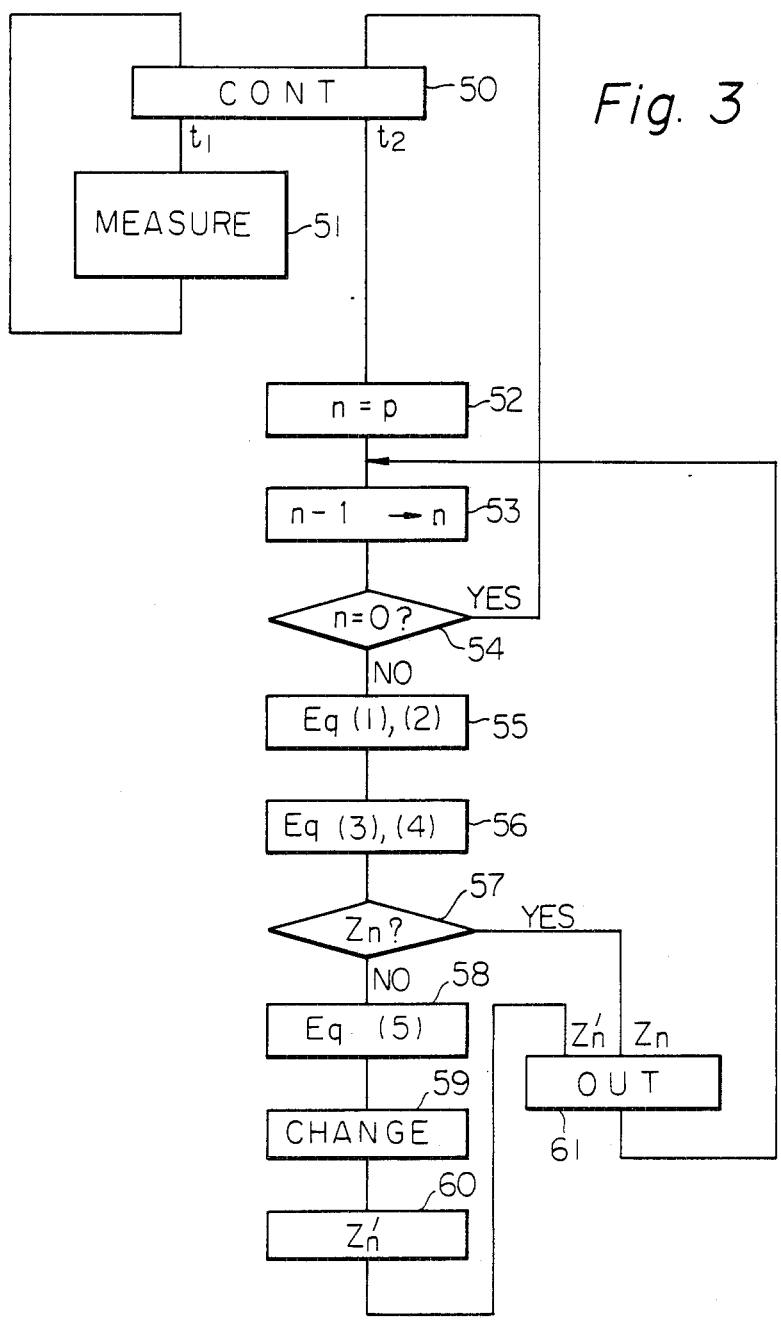
FIG. 3 is an embodiment of a computer flow-chart for the computer system according to the present invention.

One embodiment of the flow-chart of the software for the digital computer system is shown in FIG. 3. The operation in the boxes or steps of FIG. 3 is explained below.

(50): CONT means the control program or the monitor program which supervises all operation in the digital computer system.

(51): MEASURE functions to read the digital data concerning the viscosity of the input and output of each polymerization vessel, and to store the measured data in the memory system of the computer itself. This program (51) is triggered every $t_1$ seconds. The time $t_1$ is counted by a clock counter, which interrupts the central processing unit of the computer system every $t_1$ seconds.

(52): This box is triggered every $t_2$ seconds by the control program 50. This box defines a number of stages p (in the embodiment of FIG. 1, p=3) "n" is variable and is initially set to p. Said "n" is stored with a particular address in the memory.

(53): In this box, one is subtracted from the content of the address "n" and the result is stored with the same address.

(54): When "n" is zero, then all operation of one cycle finishes and the control operation of the computer goes back to the control program (50). On the other hand, if "n" is not zero, the control operation for the preceding polymerization vessel is performed.

(55): In this box, the values of the equations (1) and (2) are calculated.

(56): Values of equations (3) and (4) are calculated.

(57): If the value of $Z_3$ calculated by the equation (4) is in the range from $Z_{np}$ to $Z_{mp}$ in FIG. 2, then goes to the step 61, otherwise to the step 58.

(58): Values of equations (5) are calculated and $V_{s(n-1)}$ is obtained, which is a revised command value of the preceding polymerization vessel.

(59): The predetermined value $V_{s(n-1)}$ of the preceding vessel is changed according to the result of the step 58. The revision is performed only by the change of the content of the table provided in the memory of the computer system.

(60): A revised value of $Z_{n'}$ is obtained from the $Z_n$ calculated in the step 56, and the curve of FIG. 2.

(61): A control value $Z_n$ or $Z_{n'}$ is applied to the vacuum adjuster 14, 15 or 16 in FIG. 1. Then the program goes back to the step 53, and the operation cycle from the step 53 to the step 61 is repeated for the preceding polymerization vessel.

Figure 4:
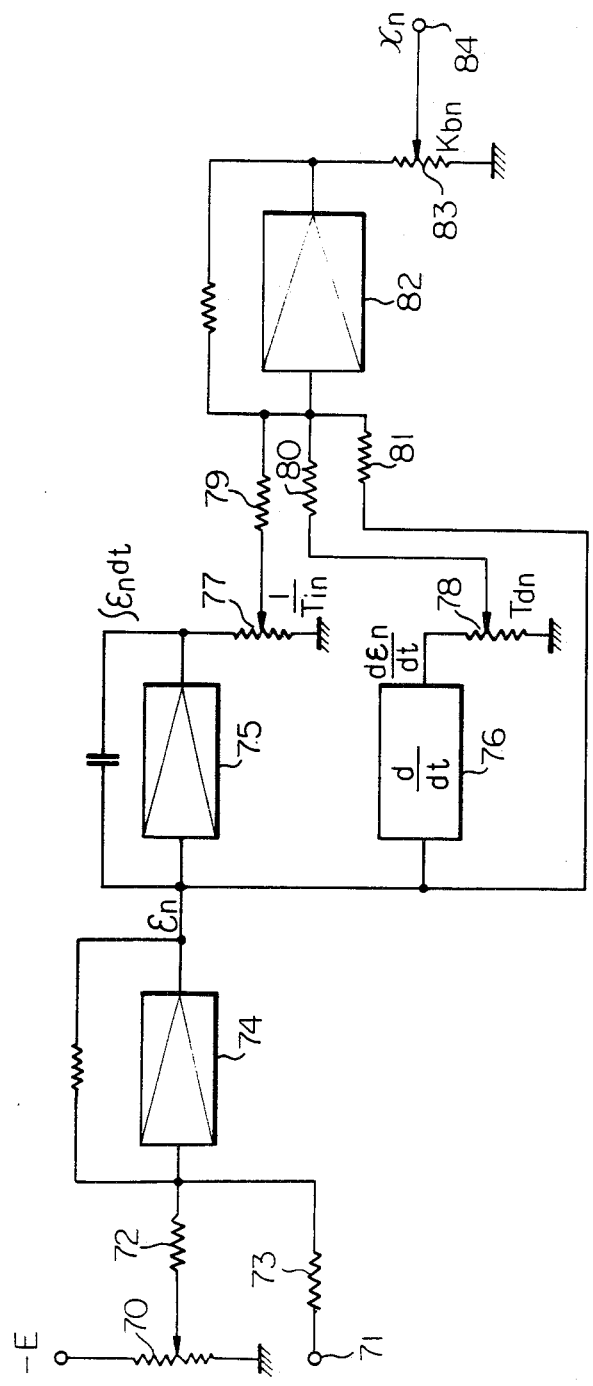
FIG. 4 is a block diagram of an analog computer unit for the computer system according to the present invention.

The other embodiment of the computer system 26 is shown in FIG. 4, in which a memory (not shown) is a digital memory and the arithmetic unit is an analog computer. FIG. 4 shows a part of the anaog computer, which calculates the value of the equation (1).

In FIG. 4, the desired command value of the n'th polymerization vessel is determined by the setting of a potentiometer 70, one terminal of which is connected to the negative source $-E$ while the other terminal is connected to ground. A voltage proportional to a measured value of viscosity is applied to a terminal 71. A feedback amplifier 74 and resistors 72, 73 operate as a differential amplifier and the difference $\epsilon$ between the measured viscosity and the desired command value is obtained at the output of the amplifier 74. Said value $\epsilon_n$ is applied to a resistor 79 through an integrator 75 and a potentiometer 77, a resistor 80 through a differentiator 76 and a potentiometer 78 and a resistor 81. The integrator 75 is an ordinary amplifier, but operates as an integrator due to feedback capacitance. The setting of the potentiometer 77 is determined according to a value of integral time $T_{in}$. The differentiator 76 provides an output proportional to the differential of $\epsilon_n$. The setting of the potentiometer 78 is determined according to the differential time $T_{dn}$. A feedback amplifier 82 operates as an adder and provides at its output a voltage proportional to $$\epsilon_n + \frac{1}{T_{in}} \int \epsilon_n dt + T_{dn} \frac{d\epsilon_n}{dt}$$

The setting of a potentiometer 83 is determined according to a constant $K_{bn}$ and then, the value of the equation (1), $X_n$, is obtained at an output terminal 84.

From the foregoing it will be apparent that a new and improved continuous process for the production of ethylene terephthalate polyesters has been found. It should be understood, of course, that the embodiment disclosed is merely illustrative and is not intended to limit the scope of the invention. Reference should be made to the appended claims, therefore, rather than the specification as indicating the scope of the invention.

What we claim is:

1. A continuous process for the production of ethylene terephthalate polyesters which comprises passing a polyester-forming fusion melt predominantly comprised of bis-2-hydroxethyl terephthalate and/or its low polymers sequentially through a series of reduced pressure polymerization vessles while controlling the degree of polymerization of the product by a controlling system, characterized in that, the viscosity of material leaving each of said vessels except for the first vessel is controlled in cascade by the steps of:

measuring melt viscosities of material entering and leaving a downstream vessel at predetermined time intervals;

storing the values so measured in a memory and calculating a resultant sum wherein said resultant sum is calculated by adding a value which corresponds to a difference between a set point and a measured value for the melt viscosity of the material leaving said downstream vessel at one of said time intervals to a value which corresponds to a difference between a set point and a measured value for the melt viscosity of material entering said downstream vessel at a predetermined time interval prior to said one time interval;

resetting the set point for pressure control of a melt viscosity of the material in said downstream vessel in response to the resultant sum; and controlling the melt viscosity by adjusting pressure of the preceding upstream vessel by automatically resetting, for the preceding upstream vessel, the set point for a melt viscosity of the material leaving said upstream vessel, when the reset set point for said downstream vessel falls outside a predetermined range.

2. A continuous process for the production of ethylene terephthalate polyesters according to claim 1, wherein said controlling system is a programmed digital computer.

3. A continuous process for the production of ethylene terephthalate polyesters according to claim 1, wherein said controlling system is an analog computer including at least an adder, an integrator and a differentiator.

4. A continuous process for the production of ethylene terephthalate polyesters according to claim 1, wherein the set point controls the degree of vacuum in said vessels and thereby the degree to polymerization of the product.

* * * * *

UNITED STATES PATENT AND TRADEMARK OFFICE
CERTIFICATE OF CORRECTION

PATENT NO. : 4,153,766
DATED : May 8, 1979
INVENTOR(S) : TOHRU KOIDE ET AL

It is certified that error appears in the above-identified patent and that said Letters Patent are hereby corrected as shown below:

On the cover page, Item [75], change "Tabashi Ezawa" to --- Tadashi Ezawa ---.

Signed and Sealed this

Ninth Day of October 1979

[SEAL]

Attest:

RUTH C. MASON
Attesting Officer

LUTRELLE F. PARKER
Acting Commissioner of Patents and Trademarks